UNITED STATES PATENT OFFICE

2,483,501

DOUBLE SALTS OF PHENOL SULFONIC ACIDS

John G. McNab, Cranford, and Carl Winning, Westfield, N. J., assignors to Standard Oil Development Company, a corporation of Delaware No Drawing. Application August 29, 1946, Serial No. 693,812

4 Claims. (Cl. 260—512)

This invention relates to a method of producing metal double salts of sulfonated phenols.

This is a continuation-in-part of our copending application Serial No. 477,842, filed March 3, 1943, now Patent Number 2,411,583, issued November 26, 1946.

The new compounds of the present invention are defined by the general formula

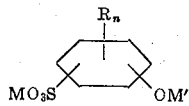

where M and M' are metals, R is hydrogen or an alkyl group, which may be a straight or branched chain, and $n$ is a small whole number representing the number of alkyl groups attached to the nucleus when R is an alkyl group. It is to be understood that in the case of polyvalent metals the remaining valences will be attached to similar groups.

If the phenol sulfonic acid salts of the present invention are to contain alkyl groups, the acids may be prepared by reacting a phenol with an olefin or olefin polymer in a hydrocarbon oil solution, while gradually adding sulfuric acid under controlled temperature conditions. In this method of preparation the sulfuric acid serves both as an alkylation catalyst and sulfonating agent. An alternative procedure is to first alkylate the phenol in the presence of a different catalyst and then sulfonate the alkylated phenol with sulfuric acid. Thus, phenol can be alkylated with di-isobutylene (the dimer of isobutylene) in the presence of stannic chloride and hydrogen chloride, or with a mixed butene polymer of 16 to 20 carbon atoms, using an $AlCl_3$—HCl catalyst, when a long branched chain radical is desired. The alkyl phenol is then sulfonated as described above. The dimer, trimer, tetramer and pentamer of isobutylene are particularly desirable as alkylating agents.

Other alkylating agents which may be used are certain of the polymeric materials obtained as by-products in the manufacture of butyl alcohol from petroleum refinery butenes. These consist essentially of polymers of n-butene with small percentages of isobutene and other olefins and may contain an average of 16–20 or 20–24 carbon atoms. Low molecular weight polymers or other olefins such as ethylene, propene, pentene and isopentene or mixtures of these may also be utilized to alkylate the phenols. The terpenes may also be so used.

Among the more preferred starting materials in the preparation of the compounds of the present invention are phenol, cresol, tert.-butyl phenol, petroleum phenols, and the like.

In order to prepare polyvalent metal double salts of the phenol sulfonic acids, it is often desirable to prepare the sodium salts first and then convert these to barium, zinc, or other polyvalent metal salts by reaction with a solution of an appropriate inorganic salt. For example, to obtain a good yield of calcium double salt, the phenol sulfonic acid may be neutralized with aqueous sodium hydroxide to make the mono sodium sulfonate, in which only the sulfonate group is neutralized, and this is then converted to the sodium double salt with alcoholic sodium hydroxide, and this salt is then treated with calcium nitrate in acetone solution to give the calcium double salt. It is also possible in the above method to convert the mono sodium salt to the sodium double salt by dissolving it in xylene or other non-aqueous solvent and treating it with finely divided solid sodium hydroxide, the water of formation being removed from the reaction by suitable means.

By an alternative procedure, the phenol sulfonic acid may be neutralized directly to the sodium double salt with alcoholic sodium hydroxide, and this salt is then converted to the calcium double salt by treating with calcium chloride in alcoholic solution.

By a further method, the phenol sulfonic acid may be converted directly to an alkaline earth metal double salt by reacting the same with an alkaline earth metal hydroxide, e. g., barium hydroxide, in the presence of a non-aqueous solvent, such as xylene or a mineral oil, and removing the water formed in the reaction during the process, e. g., by refluxing. Other metal double salts may be similarly formed.

By the use of the methods described above, it is possible to form double salts containing two different metals, one of which is attached to the sulfo group and the other substituting for hydrogen in the hydroxyl group.

The above described methods are particularly applicable to the preparation of alkaline earth metal double salts of the phenol sulfonic acids, but salts of other polyvalent metals may be formed in a similar manner.

The following example illustrates the preparation of one of the double salts of the present invention, but it will be understood that this example is not intended to limit the scope of this invention in any way.

Preparation of calcium double salt of isohexadecyl phenol sulfonic acid 296 grams of phenol, 650 grams of tetraisobutylene, and 1800 cc. of light petroleum naphtha (boiling range of 160–240° F.) were placed in a reaction vessel equipped with a stirrer and reflux condenser. 624 grams of 96% sulfuric acid were added dropwise to this mixture and the temperature kept below 35° C. After 8 hours of contact with the mixture, the spent acid was withdrawn and 300 grams of additional 96% sulfuric acid were contacted with the reaction mixture for another 8 hours. The spent acid was again removed and about half of the sulfonic acid product was neutralized with an aqueous-isopropanol (30% water, 70% isopropanol) solution of sodium hydroxide. The resulting material was dried on a drum drier, yielding 720 grams of a soft product. This was dissolved in 2 liters of 50% isopropanol and extracted several times with light petroleum naphtha. The soap layer was removed and dried in a drum drier, yielding 650 grams of mono sodium isohexadecyl phenol sulfonate. This was further purified by dissolving in light petroleum naphtha and drying, yielding 459 grams of purified product.

A solution of 160 grams of the mono sodium isohexadecyl phenol sulfonate, prepared as described above, in 500 cc. of xylene was placed in a reaction vessel equipped with a stirrer and a reflux condenser attached to a water trap. 16 grams of finely divided sodium hydroxide was added and the mixture refluxed with stirring for 2 hours, water of reaction being removed through the trap. The reaction mixture was evaporated to dryness at 100° C. under 3 mm. pressure. The residue was taken up with 500 cc. of acetone, and to this was added an acetone solution of 75 grams of calcium nitrate. The resulting precipitate was removed by filtration, and the filtrate was evaporated to dryness at 100° C. under 3 mm. pressure. There were thus obtained 152 grams of residue, which consisted of the calcium double salt of isohexadecyl phenol sulfonic acid. It was found to contain 9.05% calcium, compared to the theoretical value of 9.15%.

Other compounds illustrating the invention are: the calcium double salt of phenol sulfonic acid, the barium double salt of isohexadecyl phenol sulfonic acid, the calcium double salt of xylenol sulfonic acid, the calcium double salt of a phenol sulfonic acid in which the phenol has been alkylated with a $C_{16}$—$C_{20}$ polymer of essentially n-butene, the mixed barium-zinc double salt of isoeicosyl phenol sulfonic acid, the calcium double salt of isododecyl phenol sulfonic acid, the tin double salt of isododecyl cresol sulfonic acid, and the barium double salt of di-tert.-amyl phenol sulfonic acid. The new compounds of the present invention are useful as detergent additives for mineral lubricating oils which are to be used as crankcase lubricants for internal combustion engines.

The present invention is not to be considered as limited by any of the examples described herein, which are given by way of illustration only, but is to be limited solely by the terms of the appended claims.

We claim:
1. The method of preparing a sodium double salt of a phenol sulfonic acid, in which both the sulfo and hydroxyl groups are neutralized by sodium, which comprises reacting the phenol sulfonic acid with sodium hydroxide in the presence of water to neutralize only the sulfo group, then reacting the mono sodium salt thus formed with finely divided sodium hydroxide in the presence of a non-aqueous solvent while removing the water of neutralization as formed.

2. The method of preparing the calcium double salt of isohexadecyl phenol sulfonic acid which comprises neutralizing the sulfo group of isohexadecyl phenol sulfonic acid with an aqueous isopropanol solution of sodium hydroxide, separating and drying the mono sodium salt thus formed, further reacting the said mono sodium salt with finely divided sodium hydroxide in the presence of xylene while removing water of neutralization as formed, further reacting the sodium double salt thus formed with calcium nitrate in the presence of acetone, removing the precipitate formed, and evaporating the remaining solution to dryness.

3. The method of preparing a compound having the structure

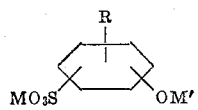

where M and M' metals are selected from the group consisting of alkali and alkaline earth metals, and R is a branched chain alkyl radical having 8 to 24 carbon atoms, which comprises reacting an alkylated phenol sulfonic acid, in which the alkyl group is a branched chain alkyl group having from 8 to 24 carbon atoms, with a metal hydroxide selected from the group consisting of alkali metal hydroxides and alkaline earth metal hydroxides in the presence of a non-aqueous solvent while removing the water of neutralization as formed.

4. The method of converting a compound of the structure

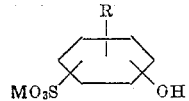

where M is a metal selected from the group consisting of alkali and alkaline metals and R is a branched chain alkyl radical having 8 to 24 carbon atoms, into a compound of the structure

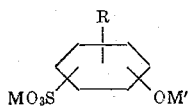

where M and M' have the same meaning as M above, and R has the same meaning as R above, which comprises reacting the first named compound with a metal hydroxide selected from the group consisting of alkali and alkaline earth metal hydroxides in the presence of a non-aqueous solvent while removing the water of neutralization as formed.

JOHN G. McNAB.
CARL WINNING.

REFERENCES CITED

The following references are of record in the file of this patent:

UNITED STATES PATENTS

| Number | Name | Date |
|---|---|---|
| 2,058,504 | Rauschert | Oct. 27, 1936 |
| 2,162,269 | Mikeska | June 13, 1939 |
| 2,209,169 | Mikeska et al. | July 23, 1940 |

OTHER REFERENCES

Mellor's Modern Inorganic Chemistry, 1939, page 620, 1 page.